Patented Nov. 4, 1930

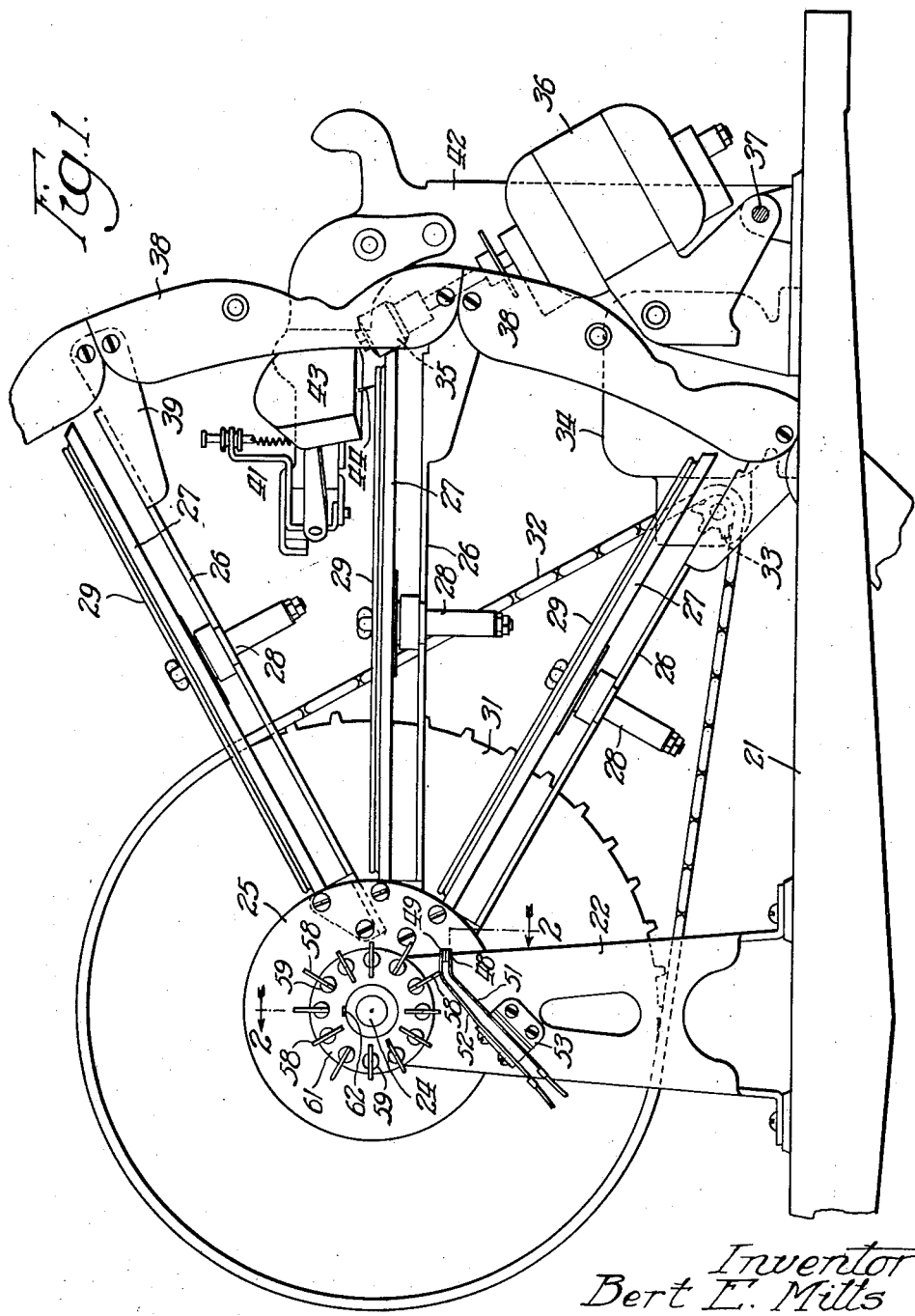

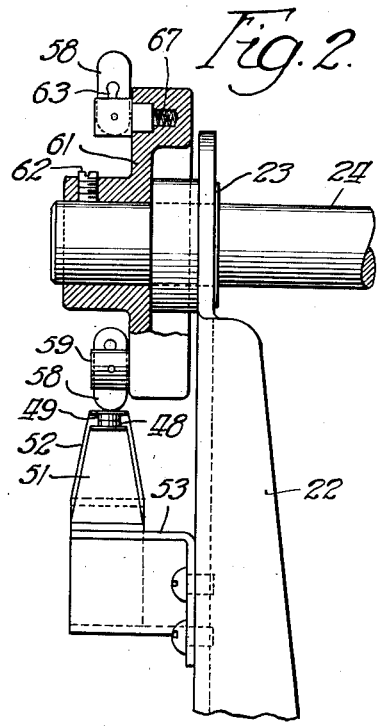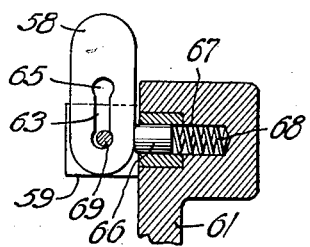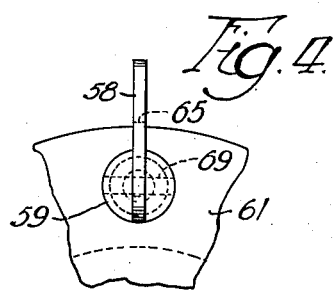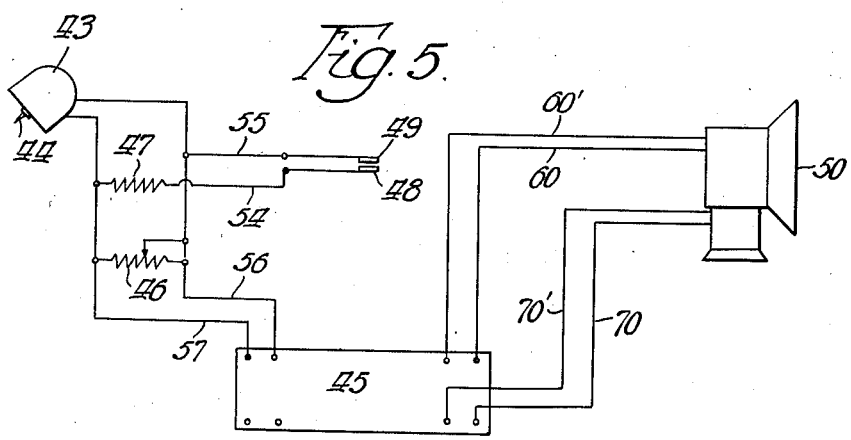

1,780,437

UNITED STATES PATENT OFFICE

BERT E. MILLS, OF OAK PARK, ILLINOIS, ASSIGNOR TO MILLS NOVELTY COMPANY, OF CHICAGO, ILLINOIS, A CORPORATION OF ILLINOIS

VOLUME-CONTROLLING DEVICE FOR AUTOMATIC PHONOGRAPHS OR THE LIKE

Application filed December 10, 1928. Serial No. 324,973.

This invention relates to automatic musical instruments and has for its object the provision in an automatic phonograph, or the like, of a tone modulating device whereby the tone volume may be controlled in accordance with the characteristics of each individual record, i. e., according to whether the record is loud, as in the case of a band or orchestral selection, in which case the tone is softened, or is soft, as in the case of certain songs and instrumental numbers, in which case full or any predetermined volume is permitted.

Other objects and advantages of the invention will be apparent as it is better understood from the following description, which, taken in connection with the accompanying drawings, discloses a preferred embodiment thereof.

Referring to the drawings,

Fig. 1 is an elevational view of a portion of an automatic phonograph, showing the mounting of the device of my invention and its relation to the driving and playing instrumentalities of the machine;

Fig. 2 is an elevational and sectional view of the contact control device provided by my invention, the view being taken substantially on the section line 2—2 in Fig. 1;

Fig. 3 is a detail showing the mounting of the clips which serve to actuate the movable contact member;

Fig. 4 is a front elevational view of the parts shown in Fig. 3; and

Fig. 5 is a wiring diagram of the pick-up and amplifier circuit, showing also, diagrammatically, the modulating device in its relation to the circuit.

On said drawings, I have shown for illustrative purposes only, a portion of an automatic phonograph instrument, comprising a frame part 21 upon which there are provided two uprights 22, one only of which is shown in Fig. 1, said uprights having bearings 23 at their upper ends for a shaft 24 which carries a record holder, the hub part 25 and certain of the record supports 26 of which are shown in said Fig. 1. Said record supports 26 have rotatable disks 27 mounted thereon by means of suitable studs 28 and the records 29 are positioned upon said disks 27.

The shaft 24 also carries a sprocket 31 which is connected by a chain 32 with a sprocket 33 adapted to be driven by a motor 34 or from any suitable source of power to intermittently rotate the record holder for the purpose of presenting the records successively to a playing station.

The disks 27 are adapted to be rotated by means of a driving element 35 driven by a motor 36 which is tiltably mounted on a pivot 37 and adapted to move toward and away from the record supporting disk 27 at the beginning and end of the playing of the record, the movement of said motor and driving element being controlled by means of a cam 38 which extends circumferentially about the record holder and is secured at intervals to the supports 26 by means of projecting flange elements 39.

A reproducing assembly generally indicated at 41 is also mounted adjacent the record holder or carrier, being pivotally attached, as shown, to an upright 42 and including a pick-up element 43 equipped with a needle 44 adapted to engage in the grooves of the record in the well-known manner and being connected by suitable wiring with a power pack and amplifier 45 which in turn is connected to a speaker 50, as shown in Fig. 5.

Any suitable number of records may be mounted on the record holder, which in the present instance is adapted to carry twelve, three only of which are shown in Fig. 1.

It will be understood that the tonal characteristics of different records vary and that to produce the best effects it is desirable to change the volume by means of a control between the pick-up and the amplifier according to the type of record to be played, less volume being desirable for a loud record and more for a soft record, as previously explained. The volume may be and usually is controlled by means of a variable resistance between the pick-up and the amplifier, such a resistance being shown at 46 in Fig. 5 and being adapted to be controlled by means of a rotatable button in a well-known manner. This, however, requires manual adajustment and makes it necessary for someone to give attention to the instrument whenever it becomes desirable to vary the tone. As a matter of practice, this type of volume control is very seldom adjusted in the case of an automatic multiple-record instrument, being left the same for all records in the machine, with the result that some are played too loudly and other perhaps too softly so that the instrument produces less pleasing effects upon the listeners than if the volume were properly controlled. Such instruments are frequently used in public places and are operated by coins dropped into a coin slot, very little attention ever being given to the instrument other than the dropping of the coins to produce the playing. The volume control may be and often is set for a soft record and then left without change when a loud record is played, or vice versa.

In accordance with my invention, a device is provided which automatically regulates the volume according to the nature of each individual record so that the proper tonal effects are produced without anyone having to give attention to the instrument while it is playing. This device comprises a resistance 47, of, say, 5,000 ohms, interposed in the amplifier circuit and associated with a contact device, the elements of which are indicated by the reference characters 48, 49. These contact elements are carried, respectively, by spring supports 51, 52 which are secured in a bracket 53 attached to one of the uprights 22, said contact supports being in turn connected by wires 54, 55 with the opposite sides 56, 57 of the circuit between the pick-up and the amplifier, the resistance 47 being included in the line 54. The power pack and amplifier 45 is connected by wiring 60, 60' with the speech coils (not shown) of the speaker 50 and wires 70 and 70' lead to additional coils employed in speakers of the dynamic type, though, of course, the invention could be as readily adapted to a magnetic or other form of speaker if desired.

The contacts 48, 49 are normally separated and for the purpose of bringing them into engagement to include the resistance 47 in the circuit 56, 57, to thereby modulate the tone in the playing of particular records, I provide a series of clips 58 which are mounted for sliding movement in bifurcated studs 59 carried upon the outer face of a collar 61 which is secured to the outer end of the shaft 24 by means of a set screw 62. Each clip is slotted as indicated at 63, the slots being enlarged at opposite ends as shown at 64 and 65. Pin plungers 66 bear against the inner side of the clips 58, said plungers being slidably mounted in recesses 67 in the face of the collar 61 and being backed by springs 68 so that said plungers bear against the clips 58 with yielding pressure at all times and tend to hold them in retracted or projected position as the case may be, there being a pin 69 disposed transversely of each of the studs 59 and extending through the slot 63 in the clip 58, the clips being held in place by engagement of said pins in the enlarged portions 64 or 65 of the slots 63.

It will be observed by viewing Fig. 1 that one of the clips 58 is provided for each of the records on the record holder or carrier, each clip bearing a fixed relationship to a particular record with which it is associated, the clip in engagement with the contact-carrier 52 in Fig. 1 being associated in this sense with the record which is shown in horizontal position at the playing station.

If a particular record is classed as a loud one, the clip 58 associated therewith may be projected so that when the record holder is turned to position to present that particular record to the playing station, the clip will engage the upper contact-carrier 52 and press it downwardly to establish contact between contact elements 49, 48 as shown in Fig. 1. This will include the resistance 47 in the circuit, thus modulating the tone automatically. The several clips may be adjusted according to the characteristics of the records with which they are associated, the projected clips serving to close the contacts 49, 48 and the retracted ones passing the contact-carrier 52 without touching it, thus leaving the contacts open and permitting the record to be played at full volume or any predetermined volume, according to the setting of the manually operated control button previously referred to.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

The automatic modulator or volume control device provided by the invention may obviously be used in other types of automatic instruments than phonographs and in phonographs having different reproducing or amplifying systems than that shown in the above described embodiment, and it is desired that the invention, as defined in the following claims, shall not be considered as limited to the particular form chosen for purposes of illustration.

I claim:

1. In an automatic phonograph, the combination of playing mechanism, means for presenting records successively to a playing station, an electrical amplifier, a resistance element in circuit therewith, and devices for automatically including said resistance element in the amplifier circuit at predetermined stages in the cycle of operations of the phonograph, to thereby control the tone volume in the playing of predetermined records.

2. In an automatic phonograph, the combination of playing mechanism, means for presenting records successively to a playing station, an electrical amplifier, a resistance element in circuit therewith, and devices for automatically including said resistance element in the amplifier circuit at predetermined stages in the cycle of operations of the phonograph, to thereby control the tone volume in the playing of predetermined records, said devices including control members for each record adapted to be set in operative or inoperative position as may be indicated by the tone characteristics of the record.

3. In an automatic phonograph, the combination of playing mechanism, an electrical amplifier, a resistance element in circuit therewith, record-changing mechanism, and means associated with said record-changing mechanism for automatically including said resistance element in the amplifier circuit at predetermined stages in the cycle of operations of the phonograph, thereby controlling the volume of individual records.

4. In an automatic phonograph, the combination of playing mechanism, record-changing mechanism, and means associated with said record-changing mechanism for automatically controlling the volume of individual records, the phonograph having electric amplification and said means including electrical resistance, contact elements, and contact closers individually associated with particular records and adapted to be set to automatically close said contacts to include said resistance in the amplifier circuit when a loud record is presented for play.

5. In an automatic music reproducing machine, the combination of electrically controlled playing mechanism, a player circuit, an adjustable resistance element in said circuit, a plurality of mechanical reproducing parts adapted to be successively presented to the playing mechanism for the playing of a succession of selections, and devices adapted to be selectively set to automatically include said resistance element in said circuit at predetermined stages in the operation of the machine, to thereby control the volume of particular selections.

6. In an automatic phonograph having a pick-up device, an amplifier, an electric circuit connecting said pick-up device and amplifier, and a movable record holder carrying a plurality of records and adapted to successively present them to a playing station, a volume control device comprising a resistance element, contacts adapted when closed to include said resistance element in the circuit to modulate the tone of the instrument, and contact closers individually associated with particular records and adapted to be moved into position adjacent said contacts as the associated record is presented to the playing station, said contact closers being adjustable and adapted to be set to actuate said contacts or not according to predetermined arrangement thereof.

7. In an automatic phonograph having a pick-up device, an amplifier, an electric circuit connecting said pick-up device and amplifier, and a movable record holder carrying a plurality of records and adapted to successively present them to a playing station, a volume control device comprising a resistance element, contacts adapted when closed to include said resistance element in the circuit to modulate the tone of the instrument, contact closers individually associated with particular records and adapted to be moved into position adjacent said contacts as the associated record is presented to the playing station, said contact closers being adjustable and adapted to be set to actuate said contacts or not according to predetermined arrangement thereof, and spring-pressed plungers engaging said contact closers to hold the same in adjusted position.

8. In an automatic phonograph, the combination of playing mechanism including an amplifying system employing an electric circuit, a record holder for a plurality of records, a shaft on which said record holder is mounted, means for rotating said shaft to change records, a member carried by said shaft and having a plurality of contact closers thereon, one for each record carried by said holder, said contact closer being arrangeable in projected or retracted position at will, contact elements positioned for actuation by said contact closers when projected, and an electrical resistance element adapted to be included in said circuit by the closing of said contacts to control the volume of the instrument in the playing of records, the contact closers for which have been arranged in projected position.

9. In an automatic phonograph, the combination of playing mechanism including an amplifying system employing an electric circuit, a record holder for a plurality of records, record-changing mechanism, a member movable with said record changing mechanism and carrying a plurality of contact closers, one for each record carried by said holder, said contact closer being arrangeable in projected or retracted position at will, contact elements positioned for actuation by said contact closers when projected, and an electrical resistance element adapted to be included in said circuit by the closing of said contacts to control the volume of the instrument in the playing of records, the contact closers for which have been arranged in projected position.

In witness whereof, I hereunto subscribe my name to this specification.

BERT E. MILLS.